US012592834B2

(12) United States Patent
Gujar et al.

(10) Patent No.: US 12,592,834 B2
(45) Date of Patent: Mar. 31, 2026

(54) SYSTEM AND METHOD FOR GENERATING A DIGITAL CERTIFICATE FOR A USER USING A DECENTRALIZED BLOCKCHAIN

(71) Applicant: International Institute of Information Technology, Hyderabad, Hyderabad (IN)

(72) Inventors: Sujit Gujar, Hyderabad (IN); Kishore Kothapalli, Hyderabad (IN)

(73) Assignee: INTERNATIONAL INSTITUTE OF INFORMATION TECHNOLOGY, HYDERABAD, Hyserabad (IN)

( * ) Notice: Subject to any disclaimer, the term of this patent is extended or adjusted under 35 U.S.C. 154(b) by 50 days.

(21) Appl. No.: 18/444,639

(22) Filed: Feb. 17, 2024

(65) Prior Publication Data

US 2024/0283660 A1     Aug. 22, 2024

(30) Foreign Application Priority Data

Feb. 17, 2023     (IN) .............................. 202341010698

(51) Int. Cl.
 *H04L 9/32*     (2006.01)
 *H04L 9/00*     (2022.01)
(52) U.S. Cl.
 CPC .......... *H04L 9/3263* (2013.01); *H04L 9/3231* (2013.01); *H04L 9/50* (2022.05)
(58) Field of Classification Search
 CPC ....... H04L 9/3263; H04L 9/3231; H04L 9/50; H04L 9/3239; H04L 9/3247; H04L 9/3268

USPC .......................................................... 713/156
See application file for complete search history.

(56) References Cited

U.S. PATENT DOCUMENTS

| | | | | |
|---|---|---|---|---|
| 2017/0236123 A1* | 8/2017 | Ali | ..................... | G06Q 20/3825 |
| | | | | 705/75 |
| 2019/0057454 A1* | 2/2019 | Komenda | ............. | H04L 9/3242 |
| 2020/0005290 A1* | 1/2020 | Madisetti | ............. | G06Q 20/065 |
| 2022/0058732 A1* | 2/2022 | Reses | ................... | G06Q 20/065 |
| 2022/0200975 A1* | 6/2022 | Madisetti | ................. | H04L 9/14 |
| 2023/0198785 A1* | 6/2023 | Henning | ................ | G06Q 20/36 |
| | | | | 380/28 |

* cited by examiner

*Primary Examiner* — Meng Vang

(57) ABSTRACT

The present disclosure provides a system and a method for generating a secure digital certificate for a user using cryptographic hashing and storing the digital certificate on a smart contract by a decentralized blockchain. The method includes (i) generating a registration token for a first user using the cryptographic hashing, (ii) storing the registration token of the first user as a second hash in the smart contract, (iii) receiving digital request through the first user device, (iv) validating (a) the digital request of the first user by (m) authenticating whether the biometrics of the first user, and (n) checking whether the second hash exists in the decentralized blockchain, and (b) the second user associated with a second user device using a driver algorithm, (v) sending a message to the second user device to initiate the digital request and (vi) generating the digital certificate when the first user receives a verification.

20 Claims, 6 Drawing Sheets

GENERATING, BY AN ENTITY, A REGISTRATION TOKEN FOR A FIRST USER USING A CRYPTOGRAPHIC HASHING, THE REGISTRATION TOKEN IS GENERATED BASED ON A FIRST HASH OF THE FIRST USER, THE FIRST HASH IS DETERMINED BASED ON PERSONAL DETAILS, AN IDENTITY (ID) OF THE FIRST USER, AND BIOMETRICS OF THE FIRST USER PROVIDED TO THE ENTITY
402

STORING, BY THE DECENTRALIZED BLOCKCHAIN, THE REGISTRATION TOKEN OF THE FIRST USER AS A SECOND HASH IN A SMART CONTRACT WITHIN THE DECENTRALIZED BLOCKCHAIN USING THE CRYPTOGRAPHIC HASHING, THE DECENTRALIZED BLOCKCHAIN INCLUDES AN ADDRESS OF A DATABASE OF ONE OR MORE SECOND USERS
404

RECEIVING, BY A PLURALITY OF SECOND USER DEVICES ASSOCIATED WITH THE ONE OR MORE SECOND USERS, A DIGITAL REQUEST THROUGH A FIRST USER DEVICE ASSOCIATED WITH THE FIRST USER, THE REGISTRATION TOKEN IS PROVIDED TO THE FIRST USER DEVICE ASSOCIATED WITH THE FIRST USER, THE DIGITAL REQUEST INCLUDES AT LEAST ONE OF THE REGISTRATION TOKEN, A BIOMETRIC, OR AN IDENTITY CHECK
406

VALIDATING, BY THE DECENTRALIZED BLOCKCHAIN, (A) THE DIGITAL REQUEST OF THE FIRST USER BY (I) AUTHENTICATING WHETHER THE BIOMETRIC OF THE FIRST USER ASSOCIATED WITH THE DIGITAL REQUEST IS VALID USING AN AUTHENTICATION ALGORITHM, AND (II) CHECKING WHETHER THE SECOND HASH OF THE REGISTRATION TOKEN OF THE FIRST USER EXISTS IN THE SECOND ENTITY USING THE CRYPTOGRAPHIC HASHING, AND (B) THE PLURALITY OF SECOND USERS ASSOCIATED WITH THE ONE OR MORE SECOND USER DEVICES USING A DRIVER ALGORITHM
408

FIG. 4A

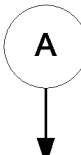

SENDING, BY THE DECENTRALIZED BLOCKCHAIN, A MESSAGE TO THE PLURALITY OF SECOND USER DEVICES ASSOCIATED WITH THE ONE OR MORE SECOND USERS TO INITIATE THE DIGITAL REQUEST TO THE FIRST USER IF (I) THE DIGITAL REQUEST OF THE FIRST USER IS VALID, AND (II) THE ONE OR MORE SECOND USERS WHO HAVE RECEIVED THE DIGITAL REQUEST IS VALID
410

GENERATING, BY THE DECENTRALIZED BLOCKCHAIN, THE DIGITAL CERTIFICATE FOR THE FIRST USER BY CREATING A RECORD OF INFORMATION FOR THE FIRST USER IN THE DECENTRALIZED BLOCKCHAIN WHEN THE FIRST USER RECEIVES A VACCINE BY THE ONE OR MORE SECOND USERS
412

FIG. 4B

SYSTEM AND METHOD FOR GENERATING A DIGITAL CERTIFICATE FOR A USER USING A DECENTRALIZED BLOCKCHAIN

CROSS-REFERENCE TO RELATED APPLICATIONS

This patent application claims priority to pending Indian provisional patent application No. 20/2341010698 filed on Feb. 17, 2023, the complete disclosures of which, in their entirety, are hereby incorporated by reference.

BACKGROUND

Technical Field

The present disclosure relates generally to a blockchain, and more particularly, the present disclosure relates to generating a digital certificate for a user using a decentralized blockchain system, thereby protecting information of the one or more users against unauthorized users and entities.

Description of the Related Art

A blockchain is a distributed ledger database that includes records of transactions and related information, encrypted for security. The blockchain network achieves a majority consensus on transactions through a validation process, and the information is stored in sealed blocks. These blocks are linked using cryptographic techniques, recording information from a previous block in each subsequent block. Once confirmed enough times, the blocks become nearly impossible to alter. Vaccination protects individuals and an entire society from harmful and fatal diseases. A vaccination record includes the name of the vaccine, the name of the person vaccinated, or the date of vaccination. The vaccination record provides details of health care to everyone. However, the vaccination record is preserved as physical copies and is prone to challenges such as losing, damaging, or forging. Also, accessing the physical copies of the vaccination record across certain regions is complicated and time-consuming.

An existing vaccination record management system carries vaccination records through the centralized web portal/server/applications. However, the existing vaccination record management system is prone to single-point failures and jeopardizes data security. Another existing vaccination record management system mainly deals with slot bookings and issuing non-verifiable vaccination certificates online. However, the existing system does not verify vaccination certificates while issued. Moreover, the process to verify the vaccination certificate consumes more time and requires manual intervention.

In another existing system, a centralized model of a vaccination record management system automatically updates vaccination records. However, due to the absence of an authentication process, there may be inaccurate statistics for updating vaccination records. The inaccurate statistics in updating the vaccination records may lead to inappropriate analysis and execution that affect the future planning of the vaccination record management system and may involve significant economic loss.

An existing vaccination record management system doesn't validate the eligibility of a user to get vaccinated based on the stored data of the user. Also, the existing online vaccination record management system does not coordinate and authenticate different stakeholders.

Therefore, there arises a need to address the aforementioned technical drawbacks in existing technologies for protecting the information of one or more users against unauthorized users and entities.

SUMMARY

In a view of the foregoing, an embodiment herein provides a processor-implemented method for generating a secure digital certificate for a user using a cryptographic hashing and storing the digital certificate on a smart contract by a decentralized blockchain. The method includes generating, by an entity, a registration token for the first user using the cryptographic hashing. The registration token is generated based on a first hash of the first user. The first hash is determined, using the cryptographic hashing, based on personal details, an identity (ID) of the first user, and biometrics of the first user provided to the entity. The method includes storing, by the decentralized blockchain, the registration token of the first user as a second hash in the smart contract within the decentralized blockchain using the cryptographic hashing. The decentralized blockchain further includes an address of a database of a plurality of second users. The method includes receiving, by a plurality of second user devices associated with the plurality of second users, a digital request through the first user device associated with the first user. The registration token is provided to the first user device associated with the first user. The digital request comprises at least one of (a) the registration token, or (b) the biometrics. The method includes validating, by the decentralized blockchain, (a) the digital request of the first user by (i) authenticating whether the biometrics of the first user associated with the digital request are valid using an authentication algorithm, and (ii) checking whether the second hash of the registration token of the first user exists in the second entity using the cryptographic hashing, and (b) the plurality of second users associated with the plurality of second user devices using a driver algorithm. The method includes sending, by the decentralized blockchain, a message to the plurality of second user devices associated with the plurality of second users to initiate the digital request to the first user if (i) the digital request of the first user is valid, and (ii) the plurality of second users who have received the digital request is valid. The method includes generating, by the decentralized blockchain, the digital certificate for the first user by creating a record of information for the first user in the decentralized blockchain when the first user receives a verification by the plurality of second users.

In some embodiments, the method includes (i) generating an identity (ID) number for the first user based on input data using an ID generation algorithm, the input data includes at least one of (a) the personal details or (b) the biometrics of the plurality of users and (ii) validating, by the entity, the personal details of the first user and registering the personal details and the ID number of the first user on the first hash of the biometrics of the first user if the personal details of the first user are valid, the first hash of the biometrics of the first user is generated using the cryptographic hashing.

In some embodiments, the authentication algorithm validates the biometrics of the first user associated with the digital request by (i) enabling an access to fetch the personal details of the first user from the entity using the first hash of the biometrics of the first user, and (ii) checking whether the fetched personal details match the personal details on the registration token associated with the digital request.

In some embodiments, the method includes storing, by the decentralized blockchain, the digital certificate as a third hash in the smart contract.

In some embodiments, the method comprises receiving, by the decentralized blockchain, verification requests from a plurality of third-user devices associated with a plurality of third users when the plurality of third-user devices receive the digital certificate from the first user device.

In some embodiments, the method includes validating, by the decentralized blockchain, the verification requests from the plurality of third-user devices using a blockchain based distributed ledger algorithm by checking whether the digital certificate of the first user exists in the decentralized blockchain or not.

In some embodiments, the method includes sending, by the decentralized blockchain, the message to the plurality of second user devices when the first user satisfies a set of conditions.

In some embodiments, the method includes updating, by the decentralized blockchain, the second hash of the registration token, and the ID number by including the record of information associated with the digital certificate.

In some embodiments, the driver algorithm validates the plurality of second users associated with the plurality of second user devices by checking whether the address of the plurality of second users who have received the digital request, exists in an address database.

In some embodiments, the method further includes transferring ownership of the record of information of the first user to a fourth user by (i) generating, by the cryptographic hashing, a verification token for the record of information, the verification token comprises a digital key and an amount required for transferring the ownership of the record of information, (ii) sending, by the decentralized blockchain, the verification token to the fourth user through a fourth user device, and (iii) receiving, by the decentralized blockchain, the amount from the fourth device when the fourth user device authenticates the record of information of the first user using the digital key in the decentralized blockchain, thereby securely transferring the ownership of information from one user to another user.

In one aspect, a system for generating a secure digital certificate for a user using a cryptographic hashing and storing the digital certificate on a smart contract by a decentralized blockchain is provided. The system includes a memory and a processor. The memory includes a set of instructions. The processor executes the set of instructions and is configured to (i) generate, by an entity, a registration token for the first user using the cryptographic hashing, the registration token is generated based on a first hash of the first user, the first hash is determined, using the cryptographic hashing, based on personal details, an identity (ID) of the first user, and biometrics of the first user provided to the entity, (ii) store, by the decentralized blockchain, the registration token of the first user as a second hash in the smart contract within the decentralized blockchain using the cryptographic hashing, the decentralized blockchain further includes an address of a database of a plurality of second users, (iii) receive, by a plurality of second user devices associated with the plurality of second users, a digital request through the first user device associated with the first user, the registration token is provided to the first user device associated with the first user, the digital request includes at least one of (a) the registration token, or (b) the biometrics, (iv) validate, by the decentralized blockchain, (a) the digital request of the first user by (i) authenticating whether the biometrics of the first user associated with the digital request are valid using an authentication algorithm, and (ii) checking whether the second hash of the registration token of the first user exists in the second entity using the cryptographic hashing, and (b) the plurality of second users associated with the plurality of second user devices using a driver algorithm, (v) send, by the decentralized blockchain, a message to the plurality of second user devices associated with the plurality of second users to initiate the digital request to the first user if (i) the digital request of the first user is valid, and (ii) the plurality of second users who have received the digital request is valid, and (vi) generate, by the decentralized blockchain, the digital certificate for the first user by creating a record of information for the first user in the decentralized blockchain when the first user receives a verification by the plurality of second users.

In some embodiments, the processor is configured to (i) generate an identity (ID) number for the first user based on the input data using an ID generation algorithm, the input data includes at least one of (a) the personal details or (b) the biometrics of the plurality of users, and (ii) validate, by the entity, the personal details of the first user and registering the personal details and the ID number of the first user on the first hash of the biometrics of the first user if the personal details of the first user are valid, the first hash of the biometrics of the first user is generated using the cryptographic hashing.

In some embodiments, the authentication algorithm validates the biometrics of the first user associated with the digital request by (i) enabling access to fetch the personal details of the first user from the entity using the first hash of the biometrics of the first user, and (ii) checking whether the fetched personal details match the personal details on the registration token associated with the digital request.

In some embodiments, the processor is configured to store, by the decentralized blockchain, the digital certificate as a third hash in the smart contract. In some embodiments, wherein the processor is configured to receive, by the decentralized blockchain, verification requests from a plurality of third-user devices associated with a plurality of third users when the plurality of third-user devices receive the digital certificate from the first user device.

In some embodiments, wherein the processor is configured to validate, by the decentralized blockchain, the verification requests from the plurality of third-user devices using a blockchain-based distributed ledger algorithm by checking whether the digital certificate of the first user exists in the decentralized blockchain or not.

In some embodiments, the processor is configured to send, by the decentralized blockchain, the message to the plurality of second user devices when the first user satisfies a set of conditions.

In some embodiments, the processor is configured to update, by the decentralized blockchain, the second hash of the registration token, and the ID number by including the record of information associated with the digital certificate.

In some embodiments, the driver algorithm validates by checking whether the address of the plurality of second users who have received the digital request, exists in an address database.

In another aspect, one or more non-transitory computer-readable storage mediums store one or sequences of instructions, which when executed by one or more processors, causes a method for generating a secure digital certificate for a user using a cryptographic hashing and storing the digital certificate on a smart contract by a decentralized blockchain. The method includes generating, by an entity, a registration token for the first user using the cryptographic hashing. The registration token is generated based on a first hash of the first user. The first hash is determined, using the cryptographic hashing, based on personal details, an identity (ID) of the first user, and biometrics of the first user provided to the entity. The method includes storing, by the decentralized blockchain, the registration token of the first user as a second hash in the smart contract within the decentralized blockchain using the cryptographic hashing. The decentralized blockchain further includes an address of a database of a plurality of second users. The method includes receiving, by a plurality of second user devices associated with the plurality of second users, a digital request through the first user device associated with the first user. The registration token is provided to the first user device associated with the first user. The digital request includes at least one of (a) the registration token, or (b) the biometrics. The method includes validating, by the decentralized blockchain, (a) the digital request of the first user by (i) authenticating whether the biometrics of the first user associated with the digital request are valid using an authentication algorithm, and (ii) checking whether the second hash of the registration token of the first user exists in the second entity using the cryptographic hashing, and (b) the plurality of second users associated with the plurality of second user devices using a driver algorithm. The method includes sending, by the decentralized blockchain, a message to the plurality of second user devices associated with the plurality of second users to initiate the digital request to the first user if (i) the digital request of the first user is valid, and (ii) the plurality of second users who have received the digital request is valid. The method includes generating, by the decentralized blockchain, the digital certificate for the first user by creating a record of information for the first user in the decentralized blockchain when the first user receives a verification by the plurality of second users.

A system for generating a secure digital certificate for a user using a cryptographic hashing and storing the digital certificate on a smart contract by a decentralized blockchain is provided. The system utilizes off-chain and on-chain databases that optimize resource utilization, enhance scalability, and ensure secure verification of vaccination certificates while minimizing transaction costs. The system eliminates reliance on centralized systems to manage vaccination records by adopting the decentralized blockchain. This decentralization reduces the risk of single points of failure or enhances the data privacy of vaccination certificates. The system utilizes the decentralized blockchain, each with 1.5 Petabytes of storage. This allows for the storage of a large volume of vaccination data securely on the blockchain. The decentralized blockchain manages vaccination records for both users and their family members. The decentralized blockchain ensures that all vaccination information is verifiable. The system charges a cost for both registration and vaccination. The cost for a single registration is 0.026 USD, and the cost for a single vaccination is 0.078 USD. The system processes up to 20,000 digital requests for vaccinations per hour.

Each vaccination record stored on the decentralized blockchain has a maximum size of 1 KB. Therefore, data size per individual depends on the number of vaccines directed to that individual, with each vaccination record assessed to be 200×1 KB=200 KB. Accordingly, the total data storage size of the vaccination record on the decentralized blockchain for the entire population over the next 100 years is calculated as 200 KB×3 billion, which equals 600 billion KB or 600 TB (terabytes). The storage size is approximately 15.69 TB per billion individuals or 181.89 TB per billion over the specified period.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed descriptions with reference to the drawings, in which:

FIGS. 4A and 4B are flow charts that illustrate a method for generating a digital certificate for a user using a decentralized blockchain according to some embodiments herein.

DETAILED DESCRIPTION OF PREFERRED EMBODIMENTS

Figure 1:
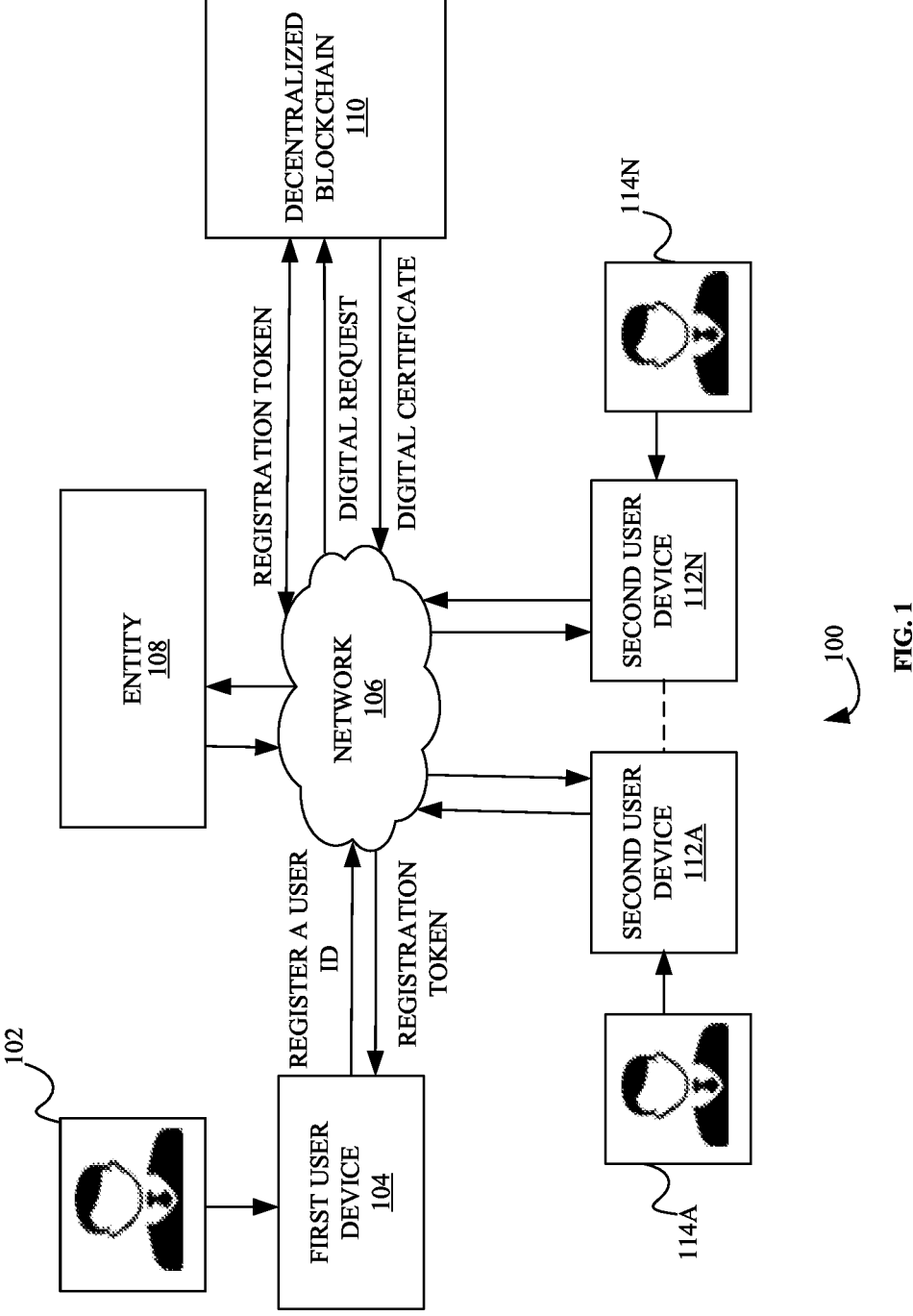
FIG. 1 is a block diagram that illustrates a system for generating a digital certificate for a user using a decentralized blockchain according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved approach that overcomes technical drawbacks in existing technologies for securing record management. The embodiments herein achieve this by protecting the information of one or more users against unauthorized users and entities by generating a digital certificate for a user using a decentralized blockchain. This enables scalability and secures information of one or more users against unauthorized users and entities. Referring now to the drawings and more particularly to FIGS. 1 through 5, where similar reference characters denote corresponding features consistently throughout the figures, there are shown preferred embodiments.

FIG. 1 is a block diagram that illustrates a system 100 for generating a secure digital certificate for a user using cryptographic hashing and storing the digital certificate on a smart contract by a decentralized blockchain 110 according to some embodiments herein. The system 100 includes a first-user device 104 associated with a first user 102, an entity 108, a decentralized blockchain 110, and one or more second-user devices 112A-N associated with one or more second users 114A-N.

In some embodiments, the first device 104 may be a mobile phone, a smartphone, a laptop, a hand-held device, a smart wearable device, a kindle, a PDA (Personal Digital Assistant), a tablet, a computer, or an electronic notebook. The first device 104 connects a biometric scanner to scan the biometrics of the first user 102. The first user 102 may be a beneficiary. The one or more second users 114A-N may be verifiers. The entity 108 is communicatively connected to the first user device 104 through a network 106 to receive personal details and biometrics of the first user 102. The entity 108 is communicatively connected to the decentralized blockchain 110 through the network 106 to register a register token of the first user 102. The decentralized blockchain 110 is communicatively connected to the first user device 104 through the network 106 to send a registration token, and a digital certificate to the first user device 104 and to receive a digital request from the first user device 104. The decentralized blockchain 110 is communicatively connected to the one or more second user devices 112A-N through the network 106 to receive a verification request of the first user 102. In some embodiments, the network 106 may be wired or wireless. The network 106 may be a combination of wired and wireless network.

The one or more second users 114A-N may access records of the first users 102A through the one or more second-user devices 112A-N using a decentralized blockchain 110. The one or more second-user devices 112A-N may be a mobile phone, a smartphone, a laptop, a hand-held device, a smart wearable device, a kindle, a PDA (Personal Digital Assistant), a tablet, a computer, or an electronic notebook. The one or more second-user devices 112A-N are connected to the biometric scanner to scan the biometrics of the first user 102. The one or more second user devices nodes 112A-N may be a mobile phone, a smartphone, a laptop, a hand-held device, a smart wearable device, a Kindle, a PDA (Personal Digital Assistant), a tablet, a computer, a biometric scanner, or an electronic notebook. The one or more second users 114A-N may be one or more vaccinators. The one or more vaccinators may be authorized vaccinators. The decentralized blockchain 110 includes a database. The database includes an address database of the one or more second users 114A-N and an on-chain database.

The entity 108 may be a Beneficiary Identity Registration Centre (BIRC). The entity 108 may be an official national identity-issuing government body. The entity 108 includes an entity database. The entity database may be an off-chain database. The entity database may be a BIRC database. The entity database includes information of the first user 102 that is external to the decentralized blockchain 110 or that is stored outside of the decentralized blockchain 110.

The entity 108 receives the personal details and the biometrics of the first user 102 as input through the first user device 104 for registering the input in the entity database. The personal details may include but are not limited to name, date and time of birth, gender, and a list of family group numbers. The biometrics may include but are not limited to voice, fingerprint, face, or iris. The entity 108 validates the personal details of the first user 102. The entity 108 generates an identity (ID) number for the first user 102 if the personal details of the first user 102 are valid. The ID number is generated based on the personal details such as name, date of birth, and location using a universally unique identifier (UUID). For example, the unique identity number may be a 36-character UUID in the format 5f5d5c47-9e78-4c17-8afc-e56f33d7b4c2.

The entity 108 stores the personal details and the ID number of the first user 102A against a first hash of the biometrics of the first user 102 in the entity database if the personal details of the first user 102 are valid. The first hash is generated by processing the biometrics of the first user 102 through a mathematical function that results in an output of fixed length and which increases security against stored data. The mathematical function is a hash function that transforms the biometrics into a bit string of fixed size as a hash value. The hash function is applied to a digital representation of the biometric to generate a fixed-length hash code by extracting features from the biometrics of the first user 102. This process converts the biometrics of the first user 102 into a numerical representation that can be compared to other hashes.

The entity 108 generates a registration token for the first user 102 using cryptographic hashing when the personal details and the ID of the first user 102 are stored against the first hash of the biometrics of the first user 102 in the entity database. For example, the registration token may be a unique alphanumeric code or identifier assigned to an individual upon registration. The registration token is used as a key for associating records or information of the first user 102 with their identity on the decentralized blockchain 110. The registration token includes a combination of letters, numbers, or special characters that ensures security. The registration token may be "REG123456789," where "REG" signifies registration and the numbers provide a unique identifier for the first user 102.

The cryptographic hashing may be Message Digest algorithm 5 (MD5), Secure Hash algorithm 1 (SHA-1), Secure Hash algorithm 2 (SHA-2), Secure Hash algorithm 3 (SHA-3), BLAKE2, RACE Integrity Primitives Evaluation Message Digest (RIPEMD), Whirlpool, or Skein. The cryptographic hashing processes the personal details, and the biometrics of the first user 102 to generate a unique fixed-length hash value. The hash value is used as the registration token for the first user 102. The registration token is securely stored in the entity database.

The registration token is generated for authentication. The decentralized blockchain 110 stores the registration token as a second hash in the smart contract within the decentralized blockchain 110. The smart contract is a digital contract between the first 102 and the decentralized blockchain 110 with predetermined conditions. The smart contract is stored on the decentralized blockchain 110 and performs certain actions when predetermined conditions are met. The decentralized blockchain 110 issues the registration token to the first users 102 through the first user device 104 when the decentralized blockchain 110 stores the registration token as the second hash in the smart contract. The second hash of the registration token on the decentralized blockchain 110 serves as proof of the first user 102 registration on the decentralized blockchain 110

The one or more second user devices 112A-N associated with the one or more second users 114A-N receive a digital request from the first user 104 through the first user device 104. The decentralized blockchain 110 receives the digital request of the first user 102 from the one or more second user devices 112A-N. The digital vaccination request includes the registration token, and the biometrics of the first user 102. The decentralized blockchain 110 validates the digital request of the first user 102 using an authentication algorithm and cryptographic hashing. The authentication algorithm may be password-based authentication, token-based authentication, Public Key Infrastructure (PKI), Multi-factor Authentication (MFA), hash-based password authentication, or adaptive authentication.

The authentication algorithm authenticates whether the biometrics of the first user 102 associated with the digital vaccination request is valid. The authentication algorithm may be a BIRC algorithm. The authentication algorithm securely fetches the personal details of the first user 102 from the entity database in the entity 108 using the first hash of the biometrics of the first user 102 as a key into the smart contract. The cryptographic hashing checks whether the second hash of the registration token of the first user 102 exists in the decentralized blockchain 110. The decentralized blockchain 110 validates the one or more second users 114A-N associated with the one or more second user devices 112A-N using a driver algorithm. The driver algorithm may be a vaccinator driver algorithm. The vaccinator driver algorithm verifies an address of the second user 114A in the address database within decentralized blockchain 110 for authentication of the second user 114A

The decentralized blockchain 110 sends a message to the one or more second user devices 112A-N associated with the one or more second users 114A-N to initiate the digital request to the first user if (i) the digital request of the first user 102 is valid, and (ii) the second user 114A who have received the digital request is valid.

The decentralized blockchain 110 sends the message to the one or more second user devices 112A-N to initiate the digital request to the first user 102 if (i) the digital request of the first user 102 is valid, and (ii) the second user 114A who have received the digital request is authorized. The decentralized blockchain 110 sends the message to the second user device 112A associated with the second user 114A to initiate the digital request to the first user 102 when the first user 102 satisfies a set of conditions.

The decentralized blockchain 110 generates the digital certificate for the first user 102 by creating a record of information of the first user 102 when the digital request is completed by the one or more second users 114A-N. The decentralized blockchain 110 stores the digital certificate as a third hash in the smart contract. In some embodiments, The decentralized blockchain 110 transfers an ownership of the record of information of the first user to a fourth user. The ownership of the record of information is transferred by (i) generating a verification token for the record of information by the cryptographic hashing, (ii) sending the verification token to the fourth user through a fourth user device. The verification token includes a digital key and an amount required for transferring the ownership of the record of information, and (iii) receiving the amount from the fourth device when the fourth user device authenticates the record of information of the first user using the digital key in the decentralized blockchain 110. The ownership of information is securely transferred from one user to another user using the decentralized blockchain 110.

Figure 2:
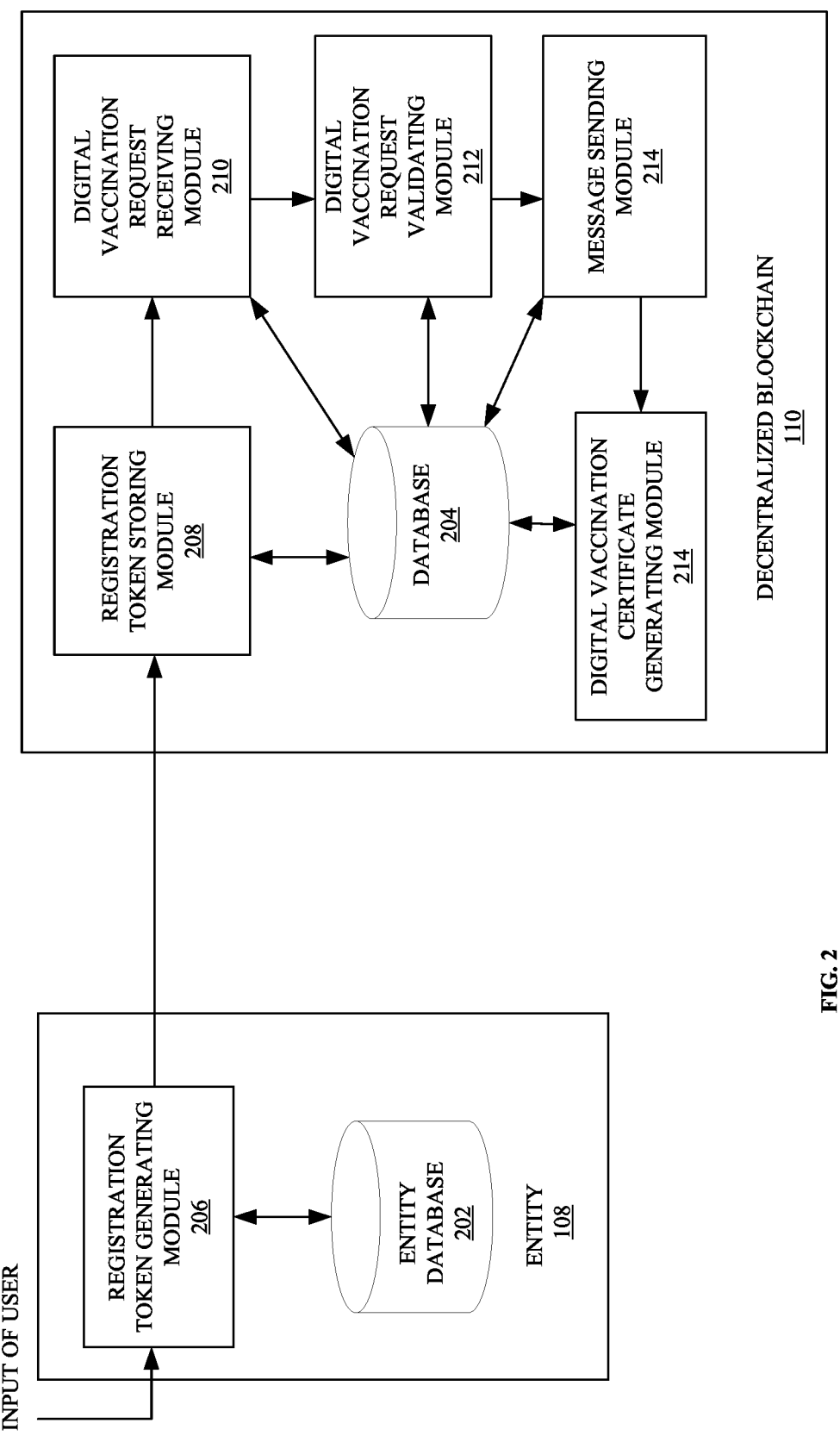
FIG. 2 is a block diagram that illustrates one or more modules of an entity and a decentralized blockchain of FIG. 1 according to some embodiments herein.

FIG. 2 is a block diagram that illustrates one or more modules of an entity 108 and a decentralized blockchain 110 of FIG. 1 according to some embodiments herein. The entity 108 includes a registration token regenerating module 206 and an entity database 108. The decentralized blockchain 110 includes a registration token storing module 208, a digital request receiving module 210, a digital request validating module 212, a message sending module 214, a digital certificate generating module 214, and a database 204. The registration token regenerating module 206 generates a registration token for a first user 102 using a cryptographic hashing. The registration token is generated based on a first hash of the first user 102. The first hash is determined based on personal details, an identity (ID) of the first user 102, and biometrics of the first user 102 provided to the entity 108 using the cryptographic hashing. The registration token storing module 208 stores the registration token of the first user 102 as a second hash in the smart contract within the decentralized blockchain 110 using the cryptographic hashing. The decentralized blockchain 110 further includes an address of a database of one or more second users 114A-N. The digital request receiving module 210 receives a digital request through the one or more second user devices 112A-N associated with the one or more second users 114A-N. The one or more second user devices 114A-N receive the digital request from a first user device 104 associated with the first user 102. The registration token is provided to the first user device 104 associated with the first user 102. The digital request includes at least one of (a) the registration token, or (b) the biometrics. The message sending module 214 sends a message to the one or more second user devices 112-N associated with the one or more second users 114A-N to initiate the digital request to the first user 102 if (i) the digital request of the first user 102 is valid, and (ii) the second user 114A who have received the digital request is valid.

The digital request validating module 212 validates (a) the digital request of the first user 102 by (i) authenticating whether the biometrics of the first user 102 associated with the digital request are valid using an authentication algorithm, and (ii) checking whether the second hash of the registration token of the first user 102 exists in the decentralized blockchain using the cryptographic hashing, and (b) the one or more second users 114A-N associated with the one or more second user devices 112A-N using a driver algorithm. The digital certificate generating module 214 generates the digital certificate for the first user 102 by creating a record of information for the first user 102 in the decentralized blockchain when the first user 102 receives a verification by the one or more second users 112A-N.

Figure 3:
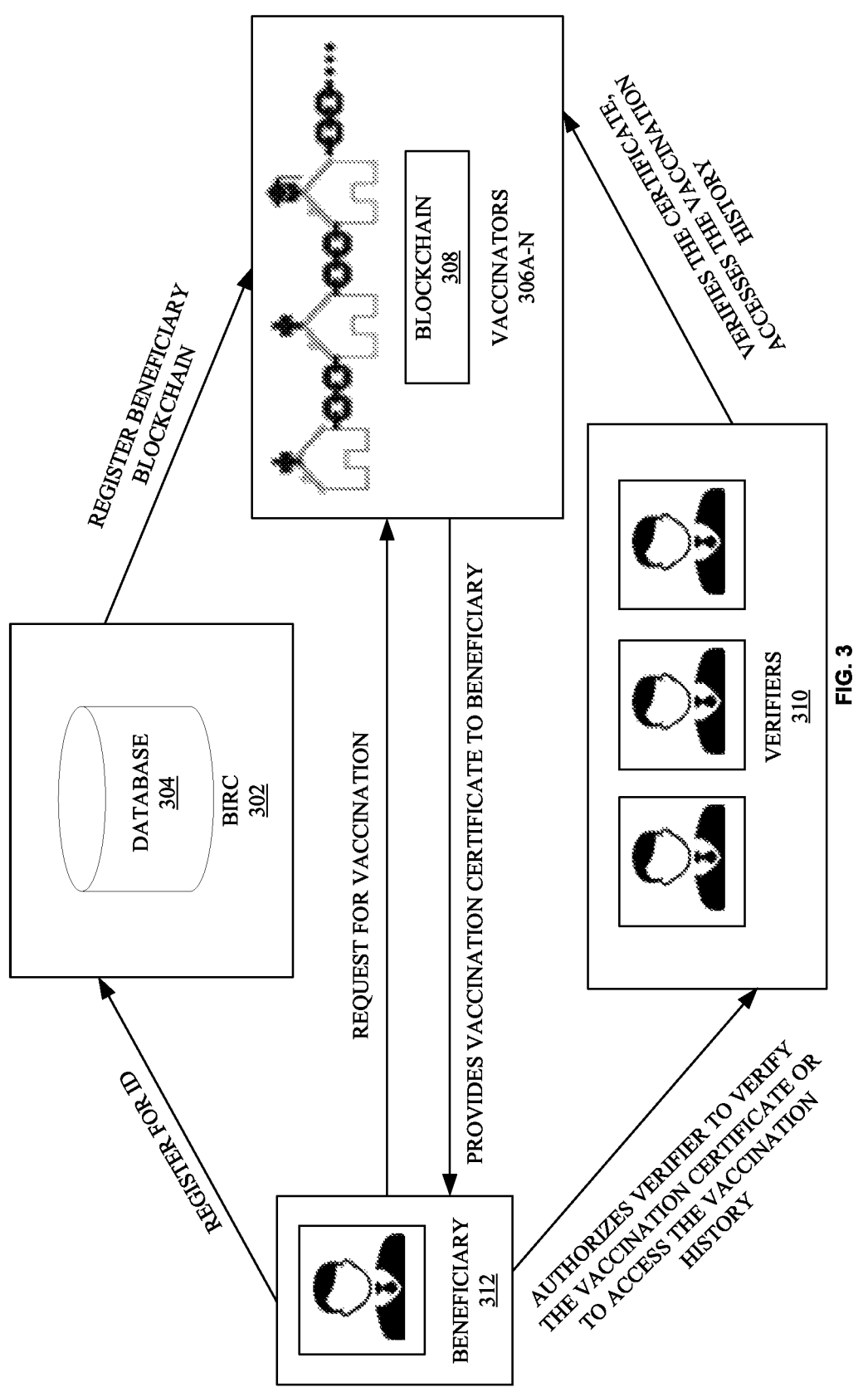
FIG. 3 is an exemplary diagram that illustrates the generation of a digital vaccination certificate by a decentralized blockchain and verification of the digital vaccination certificate through the decentralized blockchain according to some embodiments herein.

FIG. 3 is an exemplary diagram 300 that illustrates the generation of a digital vaccination certificate by a decentralized blockchain and verification of the digital vaccination certificate through the decentralized blockchain according to some embodiments herein. The exemplary diagram 300 depicts a beneficiary at 312. The beneficiary 312 provides personal details and biometrics to register at a Beneficiary Identity Registration Centre (BIRC). The BIRC is depicted at 304. The BIRC 304 validates the personal details of the first user 102 using a database as depicted in 304 and generates an identity (ID) number for the beneficiary 312. The BIRC 304 registers the beneficiary 312 in the blockchain as depicted at 308. The beneficiary 312 sends a digital request for vaccination to vaccinators as depicted in 306A-N. The blockchain 308 authorizes the vaccinator 306A who receives the digital request. The blockchain 308 checks whether the beneficiary 312 is following a set of conditions. The set of conditions includes (i) the beneficiary 312 should have already taken a required vaccination, (ii) the beneficiary 312 has to be vaccinated against a specific vaccine type only once, and (iii) the beneficiary 312 should be within minimum and maximum age limits for the vaccination required by beneficiary 312.

The blockchain 308 sends a message to the vaccinator 306A to initiate the digital request for the vaccination to the beneficiary 312 if the set of conditions are satisfied by the beneficiary 312, (ii) if the digital request is valid, and (iii) if the vaccinator 306A authorized. The authorized vaccinator 306A vaccinates the beneficiary 312 and records the vaccination details of the beneficiary 312 in the blockchain 308. The blockchain 308 generates a digital vaccination certificate based on the received vaccination details of the beneficiary 312 from the authorized vaccinator 306A by the vaccination record the beneficiary 312 in the blockchain 308. The blockchain 308 stores a hash of the digital vaccination certificate in its database. The blockchain 308 sends the digital vaccination certificate to the beneficiary 312.

The vaccination record may include, but is not limited to a vaccine ID, name of a vaccine, type of the vaccine, status of vaccination, date of vaccination, location of vaccination, name of the vaccinators, or address of the vaccinators. The blockchain 308 updates details of the vaccination of the beneficiary 312 against the registration token in the blockchain 308, and the ID number in the database 304. The blockchain 308 updates vaccination statistics of the beneficiary 312 in a smart contract. The vaccination statistics may include but are not limited to a total number of vaccinations completed for the beneficiary 312, a total number of completed vaccinations against disease in a country, a count of vaccinations, and the total number of beneficiaries vaccinated by a particular vaccine. The smart contract includes the hash of the registration token, the hash of the digital vaccination certificate, and the vaccination statistics of the digital vaccination certificate. Thereby the system 100 protects vaccination information of the beneficiary 312 against unauthorized users and entities. In some embodiments, if the age of the beneficiary 312 lies on a vaccination limit for a desired vaccine, for example, the vaccination limit is the age of the beneficiary 312 maybe 18 years old. The block chain 308 derives the due dates of the vaccine by the following equation, $$dueDates \; [vid] = currentDate + (ul[vid] - age)$$

The exemplary diagram depicts verifiers at 310. The verifiers 310 receive a verification request from the beneficiary 312 through a user device to verify the digital vaccination certificate. The verifiers 310 verifies the digital vaccination certificate of the beneficiary 312 using the blockchain 308. The verifiers 310 access the vaccination history of the beneficiary 312 in the blockchain 308 using a blockchain based distributed ledger algorithm. The blockchain based distributed ledger algorithm checks whether the digital vaccination certificate of the beneficiary 312 exists in blockchain 308 by calculating the hash of the digital vaccination certificate and matching the hash of the digital vaccination certificate on an on-chain database in the blockchain 308.

FIGS. 4A and 4B are flow charts that illustrate a method for generating a secure digital certificate for a user using a cryptographic hashing and storing the digital certificate on a smart contract by a decentralized blockchain, according to some embodiments herein. At a step 402, the method includes generating, by an entity, a registration token for the first user using the cryptographic hashing. The registration token is generated based on a first hash of the first user. The first hash is determined based on personal details, an identity (ID) of the first user, and biometrics of the first user provided to the entity using the cryptographic hashing. At a step 404, the method includes storing, by the decentralized blockchain, the registration token of the first user as a second hash in the smart contract within the decentralized blockchain using the cryptographic hashing. The decentralized blockchain further includes an address of a database of one or more second users.

This amendment corrects the informal inconsistency and aligns the figure references in the specification with the drawings. No new matter is introduced by this amendment. Accordingly, Applicant respectfully submits that this amendment fully addresses and overcomes the stated objection.

At a step 406, the method includes receiving, by one or more second user devices associated with the one or more second users, a digital request through the first user device associated with the first user. The registration token is provided to the first user device associated with the first user. The digital request includes at least one of (a) the registration token, or (b) the biometrics. At a step 408, the method includes validating, by the decentralized blockchain, (a) the digital request of the first user by (i) authenticating whether the biometrics of the first user associated with the digital request are valid using an authentication algorithm, and (ii) checking whether the second hash of the registration token of the first user exists in the decentralized blockchain using the cryptographic hashing, and (b) the one or more second users associated with the one or more second user devices using a driver algorithm.

At a step 410, the method includes sending, by the decentralized blockchain, a message to the one or more second user devices associated with the one or more second users to initiate the digital request to the first user if (i) the digital request of the first user is valid, and (ii) the one or more second users who have received the digital request is valid. At a step 412, the method includes generating, by the decentralized blockchain, the digital certificate for the first user by creating a record of information for the first user in the decentralized blockchain when the first user receives a verification by the one or more second users.

Figure 5:
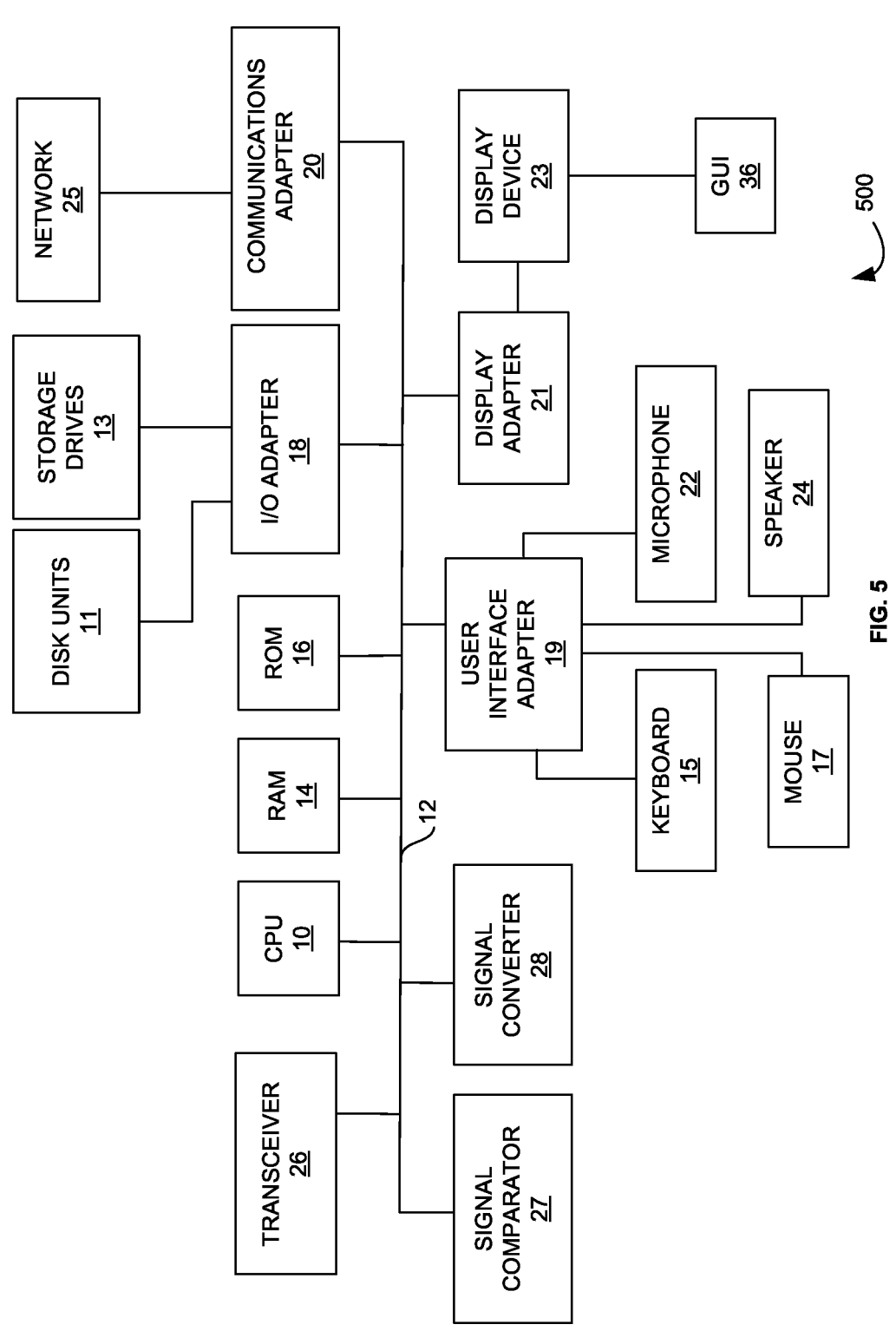
FIG. 5 is a schematic diagram of computer architecture, in accordance with the embodiments herein.

A representative hardware environment for practicing the embodiments herein is depicted in FIG. 5 with reference to FIGS. 1 through 4. This schematic drawing FIG. 5 illustrates a hardware configuration of a system 500, in accordance with the embodiments herein. The system 500 may include one or more a personal computer, a laptop, a tablet device, a smartphone, a mobile communication device, a personal digital assistant, or any other such computing device, in one example embodiment. The system 500 includes one or more processor (e.g., the processor) or central processing unit (CPU) 10. The hardware configuration includes at least one processing device and a cryptographic processor/CPU 10. The CPUs 10 are interconnected via system bus 12 to various devices such as a random-access memory (RAM) 14, read-only memory (ROM) 16, and an input/output (I/O) adapter 18. Although, CPUs 10 are depicted, it is to be understood that the system 400 may be implemented with only one CPU.

The I/O adapter 18 can connect to peripheral devices, such as disk units 11 and storage drives 13 (tape drives), or other program storage devices that are readable by the system. The system 500 can read the inventive instructions on the program storage devices and follow these instructions to execute the methodology of the embodiments herein. The system 500 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a network 25, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscopes, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few currently available network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A processor-implemented method for generating a secure digital vaccination certificate for a user using a cryptographic hashing and storing the digital vaccination certificate on a smart contract by a decentralized blockchain, wherein the method comprises, processing, by an identity validation server, personal details and biometrics of a beneficiary from a first user device associated with the beneficiary;

storing, the personal details and the biometrics of the beneficiary in an off-chain database that is external to the decentralized blockchain;

generating, by the identity validation server, a registration token for the beneficiary using the cryptographic hashing, wherein the registration token is generated based on a first hash of the beneficiary, wherein the first hash is determined, using the cryptographic hashing, based on the personal details, an identity (ID) of the beneficiary, and biometrics of the beneficiary provided to the identity validation server;

storing, by the decentralized blockchain, the registration token of the beneficiary as a second hash in the smart contract within the decentralized blockchain, using the cryptographic hashing as proof of registration of the beneficiary on the decentralized blockchain, wherein the registration token is used as a key for associating records or information of the beneficiary with their identity on the decentralized blockchain, wherein the decentralized blockchain further comprises an address of a database of a plurality of authorized vaccinators;

authenticating at least one vaccinator associated with at least one second user device, using a driver algorithm by verifying an address of the at least one vaccinator in the database of the plurality of authorized vaccinators within the decentralized blockchain;

receiving, by a plurality of second user devices associated with the plurality of authorized vaccinators, a digital request through the first user device associated with the beneficiary, wherein the registration token is provided to the first user device associated with the beneficiary, wherein the digital request comprises at least one of (a) the registration token, or (b) the biometrics;

validating, by the decentralized blockchain, (a) the digital request of the beneficiary by (i) authenticating whether the biometrics of the beneficiary associated with the digital request are valid using an authentication algorithm, and (ii) checking whether the second hash of the registration token of the beneficiary exists in the decentralized blockchain using the cryptographic hashing, and (b) the plurality of authorized vaccinators associated with the plurality of second user devices using a driver algorithm;

sending, by the decentralized blockchain, a message to the at least one authorized vaccinator associated with at least one second user device to initiate the digital request to the beneficiary only if the beneficiary fulfils at least one condition;

recording details of the beneficiary in the decentralized blockchain by the at least one authorized vaccinator after recording is completed against the registration token of the beneficiary;

generating, by the decentralized blockchain, the digital vaccination certificate for the beneficiary by creating a record of information for the beneficiary in the decentralized blockchain when the beneficiary receives a verification by the at least one authorized vaccinator;

updating the decentralized blockchain by recording vaccination details of the beneficiary linked to the registration token and ID of the beneficiary, and storing vaccination statistics in the smart contract comprising hashes of the registration token and the digital vaccination certificate; and verifying, by verifiers, the digital vaccination certificate of the beneficiary using a blockchain-based distributed ledger algorithm to calculate a hash of the digital vaccination certificate to match the hash of the digital vaccination certificate of the beneficiary stored on-chain in the blockchain.

2. The processor-implemented method of claim 1, wherein the method comprises:

generating an identity (ID) number for the beneficiary based on the input data using an ID generation algorithm, wherein the input data comprises at least one of (a) personal details or (b) the biometrics of the plurality of users; and validating, by an entity, the personal details of the beneficiary and registering the personal details and the ID number of the beneficiary on the first hash of the biometrics of the beneficiary if the personal details of the beneficiary are valid, wherein the first hash of the biometrics of the beneficiary is generated using the cryptographic hashing.

3. The processor-implemented method of claim 1, wherein the authentication algorithm validates the biometrics of the beneficiary associated with the digital request by (i) enabling an access to fetch the personal details of the beneficiary from the entity using the first hash of the biometrics of the beneficiary, and (ii) checking whether the fetched personal details match the personal details on the registration token associated with the digital request.

4. The processor-implemented method of claim 1, wherein the method comprises storing, by the decentralized blockchain, the digital vaccination certificate as a third hash in the smart contract.

5. The processor-implemented method of claim 1, wherein the method comprises receiving, by the decentralized blockchain, verification requests from a plurality of third-user devices associated with a plurality of third users when the plurality of third-user devices receive the digital vaccination certificate from the first user device.

6. The processor-implemented method of claim 5, wherein the method comprises validating, by the decentralized blockchain, the verification requests from the plurality of third-user devices using a blockchain based distributed ledger algorithm by checking whether the digital vaccination certificate of the beneficiary exists in the decentralized blockchain or not.

7. The processor-implemented method of claim 1, wherein the method comprises sending, by the decentralized blockchain, the message to the plurality of second user devices when the beneficiary satisfies a set of conditions.

8. The processor-implemented method of claim 1, wherein the method comprises updating, by the decentralized blockchain, the second hash of the registration token, and the ID number by including the record of information associated with the digital vaccination certificate.

9. The processor-implemented method of claim 1, wherein the driver algorithm validates by checking whether the address of the plurality of the authorized vaccinators who have received the digital request, exists in an address database.

10. The processor-implemented method of claim 1, the method further comprises transferring ownership of the record of information of the beneficiary to a fourth user by (i) generating, by the cryptographic hashing, a verification token for the record of information, wherein the verification token comprises a digital key and an amount required for transferring the ownership of the record of information;

(ii) sending, by the decentralized blockchain, the verification token to the fourth user through a fourth user device; and (iii) receiving, by the decentralized blockchain, the amount from the fourth device when the fourth user device authenticates the record of information of the beneficiary using the digital key in the decentralized blockchain, thereby securely transferring the ownership of information from one user to another user.

11. A system for generating a secure digital vaccination certificate for a user using a cryptographic hashing and storing the digital vaccination certificate on a smart contract by a decentralized blockchain, wherein the system comprises, a memory that includes a set of instructions;

a processor that executes the set of instructions and is configured to, process, by an identity validation server, personal details and biometrics of a beneficiary from a first user device associated with the beneficiary;

store, the personal details and the biometrics of the beneficiary in an off-chain database that is external to the decentralized blockchain;

generate, by the identity validation server, a registration token for the beneficiary using the cryptographic hashing, wherein the registration token is generated based on a first hash of the beneficiary, wherein the first hash is determined, using the cryptographic hashing, based on the personal details, an identity (ID) of the beneficiary, and biometrics of the beneficiary provided to the identity validation server;

store, by the decentralized blockchain, the registration token of the beneficiary as a second hash in the smart contract within the decentralized blockchain using the cryptographic hashing as proof of registration of the beneficiary on the decentralized blockchain, wherein the registration token is used as a key for associating records or information of the beneficiary with their identity on the decentralized blockchain, wherein the decentralized blockchain further comprises an address of a database of a plurality of authorized vaccinators;

authenticate at least one vaccinator associated with at least one second user device, using a driver algorithm by verifying an address of the at least one vaccinator in the database of the authorized vaccinators within the decentralized blockchain;

receive, by a plurality of second user devices associated with the plurality of authorized vaccinators, a digital request through the first user device associated with the beneficiary, wherein the registration token is provided to the first user device associated with the beneficiary, wherein the digital request comprises at least one of (a) the registration token, or (b) the biometrics;

validate, by the decentralized blockchain, (a) the digital request of the beneficiary by (i) authenticating whether the biometrics of the beneficiary associated with the digital request are valid using an authentication algorithm, and (ii) checking whether the second hash of the registration token of the beneficiary exists in the decentralized blockchain using the cryptographic hashing, and (b) the plurality of authorized vaccinators associated with the plurality of second user devices using a driver algorithm;

send, by the decentralized blockchain, a message to the at least one authorized vaccinator associated with at least one authorized second user device to initiate the digital request to the beneficiary only if the beneficiary fulfils at least one condition;

record details of the beneficiary in the decentralized blockchain by the at least one authorized vaccinator after recording is completed against the registration token of the beneficiary;

generate, by the decentralized blockchain, the digital vaccination certificate for the beneficiary by creating a record of information for the beneficiary in the decentralized blockchain when the beneficiary receives a verification by the at least one authorized authorized vaccinator;

update the decentralized blockchain by recording vaccination details of the beneficiary linked to the registration token and ID of the beneficiary, and storing vaccination statistics in the smart contract comprising hashes of the registration token and the digital vaccination certificate; and verify, by verifiers, the digital vaccination certificate of the beneficiary using a blockchain-based distributed ledger algorithm to calculate a hash of the digital vaccination certificate to match the hash of the digital vaccination certificate of the beneficiary stored on-chain in the blockchain.

12. The system of claim 11, wherein the processor is configured to generate an identity (ID) number for the beneficiary based on the input data using an ID generation algorithm, wherein the input data comprises at least one of (a) personal details or (b) the biometrics of the plurality of users; and validate, by an entity, the personal details of the beneficiary and registering the personal details and the ID number of the beneficiary on the first hash of the biometrics of the beneficiary if the personal details of the first user are valid, wherein the first hash of the biometrics of the beneficiary is generated using the cryptographic hashing.

13. The system of claim 11, wherein the authentication algorithm validates the biometrics of the beneficiary associated with the digital request by (i) enabling an access to fetch the personal details of the beneficiary from the entity using the first hash of the biometrics of the beneficiary, and (ii) checking whether the fetched personal details match the personal details on the registration token associated with the digital request.

14. The system of claim 11, wherein the processor is configured to store, by the decentralized blockchain, the digital vaccination certificate as a third hash in the smart contract.

15. The system of claim 11, wherein the processor is configured to receive, by the decentralized blockchain, verification requests from a plurality of third-user devices associated with a plurality of third users when the plurality of third-user devices receives the digital vaccination certificate from the first user device.

16. The system of claim 15, wherein the processor is configured to validate, by the decentralized blockchain, the verification requests from the plurality of third-user devices using a blockchain based distributed ledger algorithm by checking whether the digital vaccination certificate of the beneficiary exists in the decentralized blockchain or not.

17. The system of claim 11, wherein the processor is configured to send, by the decentralized blockchain, the message to the plurality of second user devices when the beneficiary satisfies a set of conditions.

18. The system of claim 11, wherein the processor is configured to update, by the decentralized blockchain, the second hash of the registration token, and the ID number by including the record of information associated with the digital vaccination certificate.

19. The system of claim 11, wherein the driver algorithm validates by checking whether the address of the plurality of authorized vaccinators who have received the digital vaccination request, exists in an address database.

20. One or more non-transitory computer-readable storage mediums storing one or sequences of instructions, which when executed by one or more processors, causes a method for generating a secure digital vaccination certificate for a user using a cryptographic hashing and storing the digital vaccination certificate on a smart contract by a decentralized blockchain, wherein the method comprises, processing, by an identity validation server, personal details and biometrics of a beneficiary from a first user device associated with the beneficiary;

storing, the personal details and the biometrics of the beneficiary in an off-chain database that is external to the decentralized blockchain;

generating, by the identity validation server, a registration token for the beneficiary using the cryptographic hashing, wherein the registration token is generated based on a first hash of the beneficiary, wherein the first hash is determined, using the cryptographic hashing, based on the personal details, an identity (ID) of the beneficiary, and biometrics of the beneficiary provided to the identity validation server;

storing, by the decentralized blockchain, the registration token of the beneficiary as a second hash in the smart contract within the decentralized blockchain using the cryptographic hashing as proof of registration of the beneficiary on the decentralized blockchain, wherein the registration token is used as a key for associating records or information of the beneficiary with their identity on the decentralized blockchain, wherein the decentralized blockchain further comprises an address of a database of a plurality of authorized vaccinators;

authenticating at least one vaccinator associated with at least one second user device, using a driver algorithm by verifying an address of the at least one vaccinator in the database of the plurality of authorized vaccinators within the decentralized blockchain;

receiving, by a plurality of second user devices associated with the plurality of authorized vaccinators, a digital request through the first user device associated with the beneficiary, wherein the registration token is provided to the first user device associated with the beneficiary, wherein the digital request comprises at least one of (a) the registration token, or (b) the biometrics;

validating, by the decentralized blockchain, (a) the digital request of the beneficiary by (i) authenticating whether the biometrics of the beneficiary associated with the digital request are valid using an authentication algorithm, and (ii) checking whether the second hash of the registration token of the beneficiary exists in the decentralized blockchain using the cryptographic hashing, and (b) the plurality of authorized associated with the plurality of second user devices using a driver algorithm;

sending, by the decentralized blockchain, a message to the at least one authorized vaccinators associated with at least one second user device to initiate the digital request to the beneficiary only if the beneficiary fulfils at least one condition;

recording details of the beneficiary in the decentralized blockchain by the at least one authorized vaccinator after recording is completed against the registration token of the beneficiary;

generating, by the decentralized blockchain, the digital vaccination certificate for the beneficiary by creating a record of information for the beneficiary in the decentralized blockchain when the beneficiary receives a verification by the at least one authorized vaccinator;

updating the decentralized blockchain by recording vaccination details of the beneficiary linked to the registration token and ID of the beneficiary, and storing vaccination statistics in the smart contract comprising hashes of the registration token and the digital vaccination certificate; and verifying, by verifiers, the digital vaccination certificate of the beneficiary using a blockchain-based distributed ledger algorithm to calculate a hash of the digital vaccination certificate to match the hash of the digital vaccination certificate of the beneficiary stored on-chain in the blockchain.

\* \* \* \* \*